United States Patent
Yoo et al.

(10) Patent No.: US 9,790,355 B2
(45) Date of Patent: Oct. 17, 2017

(54) THERMOPLASTIC RESIN COMPOSITION AND MOLDED ARTICLE PRODUCED THEREFROM

(71) Applicant: LG CHEM, LTD., Seoul (KR)

(72) Inventors: Je Sun Yoo, Daejeon (KR); Ki Young Nam, Daejeon (KR); Yong Yeon Hwang, Daejeon (KR); Jae Young Sim, Daejeon (KR); Seon Hyeong Bae, Daejeon (KR); Jae Yeon Bae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/883,409

(22) Filed: Oct. 14, 2015

(65) Prior Publication Data

US 2016/0145429 A1 May 26, 2016

(30) Foreign Application Priority Data

Nov. 24, 2014 (KR) .......................... 10-2014-0164287

(51) Int. Cl.
| | |
|---|---|
| *C08G 59/00* | (2006.01) |
| *C08L 63/00* | (2006.01) |
| *C08L 25/12* | (2006.01) |
| *C08K 5/00* | (2006.01) |

(52) U.S. Cl.
CPC ............ *C08L 25/12* (2013.01); *C08K 5/0066* (2013.01); *C08L 2201/02* (2013.01); *C08L 2207/04* (2013.01)

(58) Field of Classification Search
CPC ... C08K 5/0066; C08L 25/12; C08L 2201/02; C08L 2207/04
USPC .......................................... 523/451, 435, 440
See application file for complete search history.

(56) References Cited

U.S. PATENT DOCUMENTS

| | | | | |
|---|---|---|---|---|
| 5,132,350 A | * | 7/1992 | Keogh | ...................... C08K 9/04 428/463 |
| 2012/0261163 A1 | * | 10/2012 | Tai | ...................... C08L 23/0815 174/136 |
| 2012/0329920 A1 | * | 12/2012 | Sato | ...................... C08K 5/5205 524/100 |

FOREIGN PATENT DOCUMENTS

KR  EP 2505607 A1 * 10/2012  .............. C08L 25/12

* cited by examiner

*Primary Examiner* — David Karst

(57) ABSTRACT

Disclosed is a thermoplastic resin composition. Due to addition of the epoxy-based resin, the phosphorous-based flame retardant, the silicon-based compound and the calcium carbonate to the basic resin according to the present invention, a thermoplastic resin composition having superior flame retardancy and excellent rigidity, heat resistance and processability, and a molded article manufactured therefrom may be provided.

14 Claims, No Drawings

THERMOPLASTIC RESIN COMPOSITION AND MOLDED ARTICLE PRODUCED THEREFROM

CROSS REFERENCE TO RELATED APPLICATIONS

The present application claims priority to Korean application number KR 10-2014-0164287, filed on Nov. 24, 2014, which is incorporated by reference in its entirety.

TECHNICAL FIELD

The present invention relates to a thermoplastic resin composition. More particularly, the present invention relates to a thermoplastic resin composition having superior flame retardancy and excellent rigidity, heat resistance and processability, and a molded article manufactured therefrom.

BACKGROUND ART

Acrylonitrile-butadiene-styrene (hereinafter, referred to as ABS) resins are widely used as exterior materials of electric and electronic products and office machines and the like due to rigidity and chemical resistance of acrylonitrile, and processability and mechanical properties of butadiene and styrene. However, the ABS resin is inherently readily combustible and has almost no flame retardancy. Due to these problems, the ABS resin used for electric and electronic products, office equipment and the like should satisfy flame-retardancy standards in order to secure fire safety of electric and electronic products.

In regard to such flame-retardancy standards and flame retardancy test methods, there is a vertical combustion test method according to UL 94 to evaluate flame resistance against internal ignition due to electrical short, short circuit, and the like of a circuit substrate inside finished electronics.

As methods for imparting flame retardancy to ABS resins, there are a method of polymerizing a rubber-modified styrene resin through incorporation of a flame-retardant monomer during preparation of a rubber-modified styrene resin, a method of mixing a flame retardant and an auxiliary flame retardant with the prepared rubber-modified styrene resins, and the like. Examples of the flame retardant include halogen-based flame retardants such as bromine-based and chlorine flame retardants, and non-halogen flame retardants such as phosphorous, nitrogen and hydroxide flame retardants. Examples of the auxiliary flame retardant include antimony compounds, silicon compounds, zinc compounds and the like.

Thereamong, halogen flame retardants exhibit high flame retardancy, as compared to non-halogen flame retardants, and may maintain mechanical properties of rubber-modified styrene resins. At present, a method of imparting flame retardancy to ABS resins using halogen flame retardants is the most generally used. Thereamong, bromine-based flame retardants are particularly effective. However, when a bromine-based flame retardant is added during processing of ABS resins, thermal stability is deteriorated and the flame retardant is decomposed due to high temperatures and pressures during processing, thus causing generation of toxic corrosive gases and negatively affecting work environments and human health. This problem also occurs when the ABS resin processed by incorporating a bromine-based flame retardant combusts.

In an attempt to avoid this problem, a non-halogen flame retardant is used and, in particular, a phosphorous-based flame retardant is generally used. However, when a phosphorous-based flame retardant is used, flame retardancy thereof is low, compared to halogen flame retardants, and thus, a large amount of phosphorous-based flame retardant should be used. In addition, thermoplastic resin compositions which do not produce char due to the principle of phosphorous-based flame retardant systems cannot sufficiently exert flame retardancy. In addition, generally used phosphate compounds, such as triphenyl phosphate, tricresyl phosphate, tri(2,6-diphenyl phosphate), tri(2,4,6-trimethylphenyl)phosphate, etc., as a phosphorous-based flame retardant have plasticization effects to resins, and thus, overall heat deflection temperature (HDT) of a resin is decreased.

In addition, when a phosphorous-based flame retardant and an epoxy-based resin as a char generation material are added to a thermoplastic resin composed of an ABS copolymer and a SAN copolymer, flame retardancy is enhanced, but heat deflection temperature and rigidity are low, compared to flame-retardant ABS products to which generally used halogen-based retardants are applied.

DISCLOSURE

Technical Problem

Therefore, the present invention has been made in view of the above problems, and it is one object of the present invention to provide a thermoplastic resin composition having superior flame retardancy and excellent rigidity, heat resistance and processability.

The above and other objects can be accomplished by the present invention described below.

Technical Solution

In accordance with one aspect of the present invention, provided is a thermoplastic resin composition comprising (A) 100 parts by weight of a basic resin comprising 10 to 90% by weight of a vinyl cyano compound-conjugated diene compound-vinyl aromatic compound copolymer and 90 to 10% by weight of a vinyl aromatic compound-vinyl cyano compound copolymer X; (B) 1 to 30 parts by weight of an epoxy-based resin; (C) 1 to 30 parts by weight of a phosphorous-based flame retardant; (D) 1 to 10 parts by weight of a silicon-based compound; and (E) 1 to 5 parts by weight of a calcium carbonate compound.

In an embodiment, (B) the epoxy-based resin may be one or more selected from the group consisting of a urethane-modified epoxy resin, a polyfunctional epoxy resin and a tetrafunctional epoxy resin.

In an embodiment, the urethane-modified epoxy resin is a polymer represented by Formula 1 below:

[Formula 1]

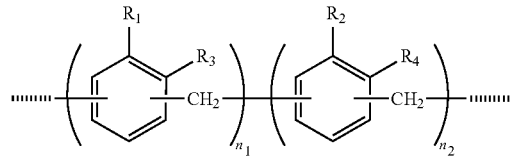

wherein $R_1$ is an epoxy group having a structure of

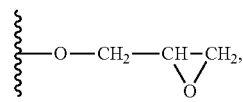

$R_3$ and $R_4$ are each independently hydrogen or an aryl group, $n_1$ and $n_2$ are a natural number of 1 to 100, and $R_2$ is a group represented by Formula 2 below, a terminal of which is substituted with isocyanate:

[Formula 2]

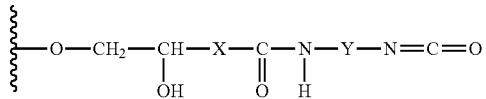

wherein X and Y are each independently a $C_1$ to $C_{20}$ alkylene or arylene group, the alkylene or arylene group may randomly comprise oxygen, nitrogen or a combination thereof.

In an embodiment, the polyfunctional epoxy resin may be a polymer represented by Formula 3 below:

[Formula 3]

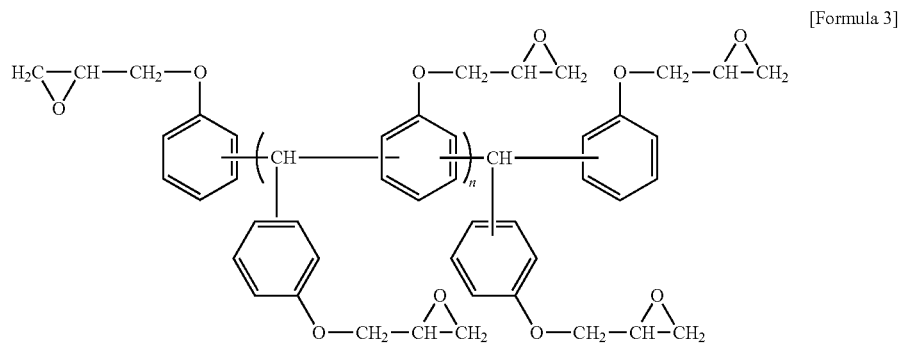

wherein n is a natural number of 1 to 100.

In an embodiment, the tetrafunctional epoxy resin may be a polymer represented by Formula 4 below:

[Formula 4]

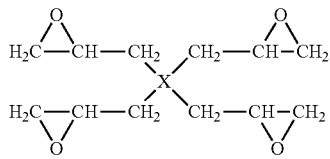

wherein X is an atomic group formed by subtracting four hydrogen atoms from a $C_1$ to $C_{30}$ aliphatic or aromatic hydrocarbon, and the atomic group may randomly comprise oxygen, nitrogen or a combination thereof.

In an embodiment, the conjugated diene compound may be comprised in an amount of 30 to 70% by weight based on a total weight of the vinyl cyano compound-conjugated diene compound-vinyl aromatic compound copolymer in the vinyl cyano compound-conjugated diene compound-vinyl aromatic compound copolymer.

In an embodiment, the weight-average molecular weight of the vinyl aromatic compound-vinyl cyano compound copolymer may be 10,000 to 300,000 g/mol, and comprises 5 to 50% by weight of the vinyl cyano compound.

In an embodiment, (C) the phosphorous-based flame retardant is one or more selected from the group consisting of phosphate-based compounds, diphosphate-based compounds, polyphosphate-based compounds having three or more phosphate groups, phosphonate-based compounds, phosphinate-based compounds and diethylphosphinic acid metal compounds.

In an embodiment, the viscosity of (D) the silicon-based compound may be 300,000 to 1,000,000 cst.

In an embodiment, (D) the silicon-based compound may be a compound represented by Formula 5 below:

[Formula 5]

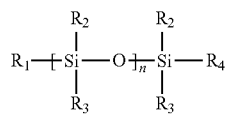

wherein $R_1$ and $R_4$ are each independently a $C_1$ to $C_{20}$ alkyl group, and $R_2$ and $R_3$ are each independently a $C_1$ to $C_{10}$ alkyl group.

In an embodiment, an average particle diameter of (E) the calcium carbonate compound is 0.1 to 50 μm.

In an embodiment, the thermoplastic resin composition may further comprise one or more additives selected from the group consisting of an impact modifier, a thermal stabilizer, an anti-dripping agent, an antioxidant, a light stabilizer, a UV filter, a pigment and an inorganic filler.

In an embodiment, the thermoplastic resin composition may have a heat deflection temperature (HDT) of 77 to 90° C.

In an embodiment, the thermoplastic resin composition may have a melt flow rate (MFR) of 56 to 100 g/10 min.

In accordance with another aspect of the present invention, provided is a molded article manufactured from the thermoplastic resin composition.

Advantageous Effect

As apparent from the fore-going, the present invention advantageously provides a thermoplastic resin composition having superior flame retardancy and excellent rigidity, heat resistance and processability by adding an epoxy-based resin, a phosphorous-based flame retardant, a silicon-based compound and a calcium carbonate to the basic resin according to the present invention. In particular, the thermoplastic resin composition may satisfy UL 94 certification as a flame retardancy standard.

BEST MODE

Hereinafter, the present invention is described in detail.

The present inventors confirmed that, when a silicon-based compound and calcium carbonate along with an epoxy-based resin and a phosphorous-based flame retardant are added to a thermoplastic resin composed of a vinyl cyano compound-conjugated diene compound-vinyl aromatic compound copolymer, efficiently high heat deflection temperature is exhibited without decrease in flame retardancy and rigidity of a resin, thus completing the present invention.

The thermoplastic resin composition according to the present invention comprises (A) 100 parts by weight of a basic resin comprising 10 to 90% by weight of a vinyl cyano compound-conjugated diene compound-vinyl aromatic compound copolymer and 90 to 10% by weight of a vinyl aromatic compound-vinyl cyano compound copolymer X; (B) 1 to 30 parts by weight of an epoxy-based resin; (C) 1 to 30 parts by weight of a phosphorous-based flame retardant; (D) 1 to 10 parts by weight of a silicon-based compound; and (E) 1 to 5 parts by weight of a calcium carbonate compound.

Constituents of the thermoplastic resin composition according to the present invention are as follows.

(A) Basic Resin (A) The basic resin according to the present invention is composed of a styrene-based resin. The styrene-based resin may be an acrylonitrile-butadiene-styrene (hereinafter referred to as ABS) copolymer, a styrene-acrylonitrile (hereinafter referred to as SAN) copolymer, a polystyrene (hereinafter referred to as PS) copolymer, a high impact polystyrene (hereinafter referred to as HIPS) copolymer or a mixture thereof. In an embodiment, when mechanical properties of a resin are considered, it is preferable to mix 10 to 90% by weight of the acrylonitrile-butadiene-styrene (ABS) copolymer and 90 to 10% by weight of the styrene-acrylonitrile (SAN) copolymer.

In another embodiment, the styrene-based resin may be composed of a mixture of 20 to 50% by weight of the ABS copolymer and 50 to 80% by weight of the SAN copolymer, or a mixture of 20 to 40% by weight of the ABS copolymer and 60 to 80% by weight of the SAN copolymer. Within this range, superior mechanical properties are exhibited.

The acrylonitrile-butadiene-styrene (ABS) copolymer is not specifically limited and may be prepared through emulsion graft polymerization. The content of butadiene rubber is preferably 30 to 70% by weight. In an embodiment, the content of the butadiene rubber may be 40 to 60% by weight, or 50 to 60% by weight.

In addition, the acrylonitrile-butadiene-styrene (ABS) copolymer may be prepared as a powder by emulsion graft-polymerizing the butadiene rubber and acrylonitrile and styrene monomers and then coagulating, dehydrating and drying the same. Here, when rigidity and processability are considered, it is preferable to include a butadiene rubber having a number average particle diameter of 0.1 to 0.5 μm in an amount of 40 to 70% by weight.

Preferably, the emulsion graft polymerization is carried out by continuously or batchwise adding a monomer mixture composed of 5 to 40 parts by weight of acrylonitrile and 20 to 65 parts by weight of styrene to a mixture composed of 30 to 70 parts by weight of the butadiene rubber, 0.1 to 5 parts by weight of an emulsifier, 0.1 to 3 parts by weight of a molecular weight regulator and 0.05 to 1 parts by weight of a polymerization initiator based on 100 parts by weight of total monomers included in the acrylonitrile-butadiene-styrene (ABS) copolymer.

In a preferred embodiment, the emulsion graft polymerization is carried out by continuously or batchwise adding a monomer mixture composed of 5 to 30 parts by weight of acrylonitrile and 20 to 50 parts by weight of styrene to a mixture composed of 45 to 70 parts by weight of the butadiene rubber, 0.6 to 2 parts by weight of an emulsifier, 0.2 to 1 parts by weight of a molecular weight regulator and 0.05 to 0.5 parts by weight of a polymerization initiator based on 100 parts by weight of total monomers included in the acrylonitrile-butadiene-styrene (ABS) copolymer.

In a preferred embodiment, the coagulation is carried out in the presence of a 1 to 10% aqueous sulfuric acid solution; or 1 to a 5% aqueous sulfuric acid solution.

In an embodiment, the weight-average molecular weight of the styrene-acrylonitrile (SAN) copolymer is preferably 10,000 to 300,000 g/mol. Here, the content of acrylonitrile-based monomer is preferably 5 to 50% by weight. Here, only one acrylonitrile-based monomer type or a mixture of two or more acrylonitrile-based monomer types may be used.

In a preferred embodiment, the weight-average molecular weight of the styrene-acrylonitrile (SAN) copolymer may be 30,000 to 200,000 g/mol. Here, the content of acrylonitrile-based monomer may be 10 to 40% by weight. Alternatively, the weight-average molecular weight of the styrene-acrylonitrile (SAN) copolymer may be 50,000 to 150,000 g/mol and the acrylonitrile-based monomer may be included in an amount of 20 to 40% by weight.

(B) Epoxy-Based Resin

In an embodiment, (B) the epoxy-based resin may be an epoxy-based resin that is compatible with the basic resin and may generate char when a processed thermoplastic resin is combusted.

In an embodiment, when enhanced flame retardancy is considered, the epoxy-based resin is preferably one or more selected from the group consisting of a urethane-modified epoxy resin represented by Formula 1 below, a polyfunctional epoxy resin represented by Formula 3 below and a tetrafunctional epoxy resin represented by Formula 4 below.

In an embodiment, the urethane-modified epoxy resin is formed through addition reaction of a compound having a urethane functional group to an epoxy ring of an epoxy resin. In each molecular of the urethane-modified epoxy resin, there are a urethane-modified and urethane-unmodified epoxy functional groups together. A formula of this molecule is as follows.

[Formula 1]

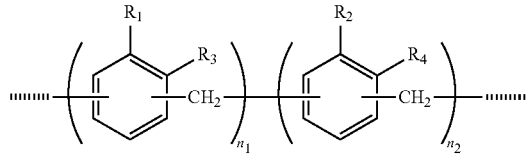

wherein $R_1$ is an epoxy group having a structure of

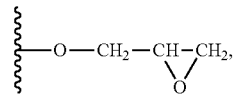

$R_3$ and $R_4$ are each independently hydrogen or an aryl group, and $n_1$ and $n_2$ are a natural number of 1 to 100, and $R_2$ is a group represented by Formula 2 below, a terminal of which is substituted with isocyanate:

[Formula 2]

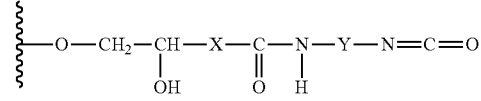

wherein X and Y are each independently a $C_1$ to $C_{20}$ alkylene or arylene group, the alkylene or arylene group may randomly comprise oxygen, nitrogen or a combination thereof.

In an embodiment, the polyfunctional epoxy resin may be a polymer represented by Formula 3 below:

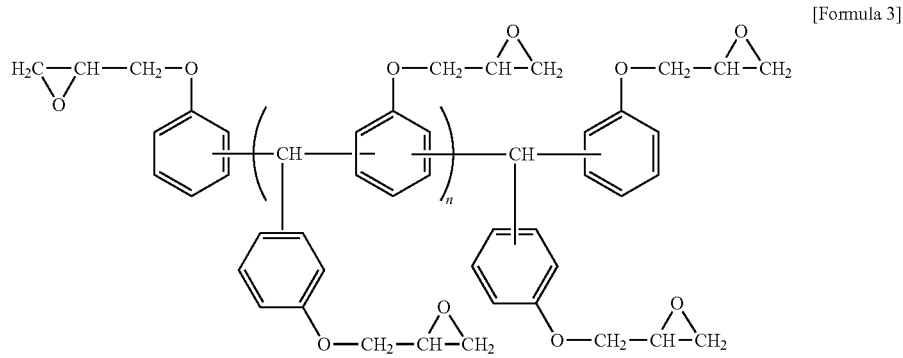

[Formula 3]

In an embodiment, the tetrafunctional epoxy resin may be represented by [Formula 4] below:

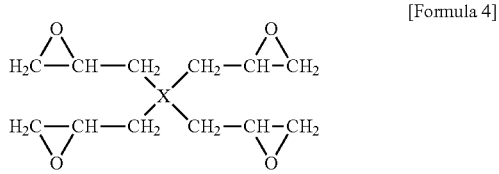

[Formula 4]

wherein X is an atomic group formed by subtracting four hydrogen atoms from a $C_1$ to $C_{30}$ aliphatic or aromatic hydrocarbon, and the atomic group may randomly comprise oxygen, nitrogen or a combination thereof.

In an embodiment, the urethane-modified epoxy resin, the polyfunctional epoxy resin or the tetrafunctional epoxy resin may be used alone or as a mixture of two or more thereof.

In a preferred embodiment, the epoxy-based resin is included in an amount of 1 to 30 parts by weight based on 100 parts by weight of the basic resin. Within this range, the thermoplastic resin composition generates char, and thus, superior flame retardancy is exhibited without application of a large amount of a phosphorous-based flame retardant. In another embodiment, the epoxy-based resin may be used in an amount of 10 to 20 parts by weight. Within this range, superior heat resistance is exhibited.

(C) Phosphorous-Based Flame Retardant (C) The phosphorous-based flame retardant is not specifically limited so long as it may be used in general thermoplastic resins. In a specific embodiment, the phosphorous-based flame retardant may be one or more selected from the group consisting of phosphate-based compounds such as triphenylphosphate, tricresylphosphate, tri(2,6-dimethylphenyl)phosphate, and tri(2,4,6-trimethylphenyl)phosphate; diphosphate-based compounds such as tetraphenyl resorcinol diphosphate, tetracresyl resorcinol diphosphate, tetra(2,6-dimethylphenyl)resorcinol diphosphate, and tetraphenyl bisphenol diphosphate; polyphosphate-based compound having three or more phosphate groups; phosphonate-based compounds; phosphinate-based compounds; and diethyl phosphinic acid metal compounds.

In a preferred embodiment, the phosphorous-based flame retardant is included in an amount of 1 to 30 parts by weight based on 100 parts by weight of the basic resin. When the phosphorous-based flame retardant is used within the range, a thermoplastic resin composition does not exhibit decreased mechanical strength and thermal stability. In another embodiment, the amount of the phosphorous-based flame retardant may be 5 to 20 parts by weight. Within this range, superior liquidity and gloss are exhibited.

(D) Silicon-Based Compound (D) When enhancement of heat resistance and processability is considered, a silicon resin is preferably used as the silicon-based compound. In an embodiment, the silicon resin may be polyalkylsiloxane.

In an embodiment, (D) the silicon-based compound may be a compound represented by Formula 5 below:

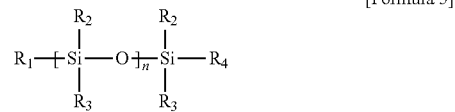

[Formula 5]

wherein $R_1$ and $R_4$ are each independently a $C_1$ to $C_{20}$ or $C_1$ to $C_5$ alkyl group, and $R_2$ and $R_3$ are each independently a $C_1$ to $C_{10}$ or $C_1$ to $C_5$ alkyl group.

In a preferred embodiment, the silicon-based compound is used in an amount of 1 to 10 parts by weight based on 100 parts by weight of the basic resin. When the silicon-based compound is used in a large amount than the content range, it is difficult to anticipate further enhanced impact modification and heat resistance and mechanical properties are decreased. Accordingly, the silicon-based compound is preferably used within the above range. In another embodiment, the silicon-based compound may be used in an amount of 3 to 7 parts by weight. Within this range, superior impact resistance and heat resistance and excellent property balance are exhibited.

In an embodiment, the viscosity of the silicon resin is preferably 300,000 to 1,000,000 cst. When the silicon resin is used within this range, liquidity and impact resistance are greatly increased and, when used at high temperature and for a long time, a slow surface elution phenomenon of a silicon resin may be prevented. In addition, uniform property balance is exhibited due to superior compatibility with a resin, and dyeability may be maintained. In another embodiment, the viscosity of the silicon-based compound may be 300,000 to 800,000 cst. Within this range, superior rigidity and processability are exhibited.

(E) Calcium Carbonate Compound

In a preferred embodiment, the (E) calcium carbonate compound is included in an amount of 1 to 5 parts by weight based on 100 parts by weight of the basic resin. When the (E) calcium carbonate compound is used in a larger amount than this range, mechanical strength and thermal stability of a prepared thermoplastic resin composition are greatly decreased. Accordingly, the (E) calcium carbonate compound is preferably used within the above range. In another embodiment, the calcium carbonate compound may be used in an amount of 1 to 3 parts by weight. Within this range, superior rigidity and flame retardancy are exhibited.

In a preferred embodiment, when mechanical strength is considered, an average particle diameter of the calcium carbonate compound is 0.1 to 50 μm.

In an embodiment, the thermoplastic composition having superior flame retardancy according to the present invention may be prepared according to a generally known method. In a specific embodiment, inputting the (A) to (E) ingredients to an extruder and mixing and extruding a barrel temperature of 210 to 240° C. may be included. Here, an extruder type is not specifically limited and, particularly when a twin-screw extruder is used, kneadability may be increased.

Now, the present invention will be described in more detail with reference to the following examples. These examples are provided only for illustration of the present invention and should not be construed as limiting the scope and spirit of the present invention.

EXAMPLE

Example 1

A butadiene rubber latex having a number average particle diameter of 0.3 μm was used, 15 parts by weight of a urethane-modified epoxy resin represented by [Formula 1] (product name: KD-1090, available from KUKDO CHEMICAL CO. LTD.) as an epoxy-based resin, 10 parts by weight of tetra(2,6-dimethylphenyl)resorcinol diphosphate (product name: PX-200, available from DAIHACHI KAGAKU KOGYO, Japan) as a phosphorous-based flame retardant, 4 parts by weight of polydimethylsiloxane having a viscosity of 500,000 cst as a silicon-based compound and 2 parts by weight of calcium carbonate ($CaCO_3$) having an average particle diameter of 0.1 to 50 μm were added to 100 parts by weight of a basic resin composed of 30 parts by weight of ABS copolymer (including 55% by weight of a butadiene rubber) manufactured through emulsion graft polymerization by LG chemistry and 70 parts by weight of a styrene-acrylonitrile copolymer including 25% by weight of acrylonitrile and having a weight-average molecular weight of 120,000 g/mol, and uniform mixing was carried out using a Henschel mixer. Subsequently, a pelletized thermoplastic resin composition was prepared using a twin-screw extruder.

The pelletized thermoplastic resin composition was injection-molded, thereby preparing as a specimen having a length of 125 mm, a width of 13 mm and a thickness of 1.5 mm for a flame retardancy test.

Example 2

An experiment was carried out in the same manner as in Example 1, except that, as an epoxy-based resin, a polyfunctional epoxy resin (product name: DNTH, available from NIPPON KAYAKU, Japan) was used instead of the urethane-modified epoxy resin represented by Formula 1.

Example 3

An experiment was carried out in the same manner as in Example 1, except that, as an epoxy-based resin, a tetrafunctional epoxy resin (product name: KDT-4400, available from KUKDO CHEMICAL CO., LTD.) represented by Formula 4 was used instead of the urethane-modified epoxy resin represented by Formula 1.

Example 4

An experiment was carried out in the same manner as in Example 1, except that, instead of the urethane-modified epoxy resin represented by Formula 1 as an epoxy-based resin, a urethane-modified epoxy resin represented by Formula 1 (product name: KD-1090, available from KUKDO CHEMICAL CO., LTD.), a polyfunctional epoxy resin represented by Formula 3 (product name: DNTH, available from NIPPON KAYAKU, Japan) and a tetrafunctional epoxy resin represented by [Formula 4] (product name: KDT-4400, available from KUKDO CHEMICAL CO., LTD.) were respectively mixed in an amount of 5 parts by weight and input.

Comparative Example 1

An experiment was carried out in the same manner as in Example 1, except that the silicon-based compound and the calcium carbonate were not input.

Comparative Example 2

An experiment was carried out in the same manner as in Example 1, except that 35 parts by weight of α-methyl styrene-acrylonitrile (AMSAN) copolymer was used instead of 35 parts by weight of the styrene-acrylonitrile (SAN) copolymer, and the silicon-based compound and the calcium carbonate were not input.

Comparative Example 3

An experiment was carried out in the same manner as in Example 1, except that 65 parts by weight of a basic resin was used by lowering the amount, i.e., 70 parts by weight, of the styrene-acrylonitrile (SAN) copolymer to 35 parts by weight, and polydimethylsiloxane having a viscosity of 1,000 cst was substituted for the silicon-based compound, and calcium carbonate was not input.

Comparative Example 4

An experiment was carried out in the same manner as in Example 1, except that aluminum oxide ($Al_2O_3$) was substituted for calcium carbonate.

Comparative Example 5

An experiment was carried out in the same manner as in Example 1, except that sodium oxide ($Na_2O_3$) was substituted for calcium carbonate.

Test Example

Properties of each of thermoplastic resin composition specimens manufactured according to Examples 1 to 4 and Comparative Examples 1 to 5 were measured according to following methods. Results are summarized in Table 1 below.

Flame retardancy: Measured according to UL 94 using a specimen with thickness of 3.0 mm and a size of 125 mm×13 mm. Particular methods were as the follows.
  (a) Sample pre-treatment (conditioning): Pre-treated for at least 24 hours in a chamber at 23±2° C. and a relative humidity of 50±5%.
  (b) Flame retardancy evaluation: Each specimen was combusted twice for 10 sec using blue flame of methane gas (flame height: 20 mm, distance between a lower portion of a specimen and an end portion of a burner: 10 mm), and then, time ($t_2$) taken until flame was disappeared and time ($t_3$) of maintained glowing were measured, and a grade was determined.
  (c) Grade: Depending upon a flame retardancy evaluation result, a grade was classified into V-0, V-1 and V-2. A standard of each grade was as follows.
    Flame extinction time after first and second combustion of each specimen ($t_1$ or $t_2$): ≤10 (V-0), ≤30 (V-1) and ≤30 (V-2)
    Sum of flame extinction times after combusting total of five specimens ($t_1+t_2$): ≤50 (V-0), ≤250 (V-1) and ≤250 (V-2)
    Sum of flame extinction time and glowing time after second combustion of each specimen ($t_2+t_3$): ≤30 (V-0), ≤60 (V-1) and ≤60 (V-2)
    Whether flame fragments or mass were fallen off and combusted a cotton 300 mm below a specimen (Dripping): No (V-0), No (V-1) and Yes (V-2)

Impact strength (Notched Izod Impact Strength): Measured according to ASTM D256 as a standard method using a ⅛" specimen.

Heat deflection temperature (Heat Deflection Temperature, HDT): Measured according to ASTM D648 as a standard method using a ¼" specimen.

Melt flow rate: Measured according to ASTM D1238 as a standard method using a specimen.

Number average particle diameter: A butadiene rubber latex was injected into a Submicron particle analyzer and particle diameter was analyzed using dynamic scattering.

Average particle diameter: The average particle diameter of calcium carbonate was measured using a general particle size measurement method.

TABLE 1

| Classification | | Examples | | | | Comparative Examples | | | | |
| --- | --- | --- | --- | --- | --- | --- | --- | --- | --- | --- |
| | | 1 | 2 | 3 | 4 | 1 | 2 | 3 | 4 | 5 |
| Emulsion polymerization ABS (parts by weight) | | 30 | 30 | 30 | 30 | 30 | 30 | 30 | 30 | 30 |
| SAN (parts by weight) | | 70 | 70 | 70 | 70 | 70 | 35 | 35 | 70 | 70 |
| AMSAN (parts by weight) | | — | — | — | — | — | 35 | — | — | — |
| Epoxy-based resin (parts by weight) | Urethane-modified epoxy resin | 15 | — | — | 5 | 15 | 15 | 15 | 15 | 15 |
| | Polyfunctional epoxy resin | — | 15 | — | 5 | — | — | — | — | — |
| | Tetrafunctional epoxy resin | — | — | 15 | 5 | — | — | — | — | — |
| Phosphorous-based flame retardant (parts by weight) | | 10 | 10 | 10 | 10 | 10 | 10 | 10 | 10 | 10 |
| Silicon compound (500,000 cst, PDMS) (parts by weight) | | 4 | 4 | 4 | 4 | — | — | — | 4 | 4 |
| Silicon compound (1,000 cst, PDMS) (parts by weight) | | — | — | — | — | — | — | 4 | — | — |
| $CaCO_3$ (parts by weight) | | 2 | 2 | 2 | 2 | — | — | — | — | — |
| $Al_2O_3$ (parts by weight) | | — | — | — | — | — | — | — | 2 | — |
| $Na_2O_3$ (parts by weight) | | — | — | — | — | — | — | — | — | 2 |
| UL 94 (grade) | | V-1 | V-1 | V-1 | V-1 | V-2 | V-2 | Fail | Fail | Fail |
| Dripping generation | | X | X | X | X | ○ | ○ | ○ | X | X |
| ⅛" Izod impact (kgf/cm²) | | 29 | 14 | 16 | 15 | 21 | 17 | 19 | 14 | 13 |

TABLE 1-continued

| Classification | Examples | | | | Comparative Examples | | | | |
| --- | --- | --- | --- | --- | --- | --- | --- | --- | --- |
| | 1 | 2 | 3 | 4 | 1 | 2 | 3 | 4 | 5 |
| Heat deflection temperature (HDT, ° C.) | 79 | 80 | 82 | 80 | 72 | 75 | 72 | 74 | 76 |
| Melt flow rate (MFR, g/10 min) | 92 | 79 | 73 | 92 | 60 | 34 | 80 | 55 | 54 |

As shown in Table 1, it can be confirmed, in Examples 1 to 4 in which the basic resin according to the present invention, the epoxy-based resin, the phosphorous-based flame retardant, the silicon-based compound and calcium carbonate are simultaneously input, superior heat deflection temperature (HDT) and melt flow rate (MFR) are exhibited. In particular, it can be confirmed that high impact resistance is exhibited in Example 1. In addition, it can be confirmed that, as a result of UL 94 evaluation, all of Examples 1 to 4 are a V-1 grade, thus having superior flame retardancy.

On the other hand, in Comparative Example 1 in which only the epoxy-based resin and the phosphorous-based flame retardant are included in the basic resin, low heat deflection temperature, melt flow rate and impact resistance are exhibited, compared to Examples 1 to 4 in which the silicon-based compound and the calcium carbonate are additionally added.

In addition, in Comparative Example 2 in which AMSAN that may increase heat resistance of an ABS resin is used, an increase range of heat deflection temperature is small compared to an input amount thereof, and impact resistance and melt index are rather decreased.

In addition, in Comparative Example 3, flame retardancy is deteriorated due to a decreased basic resin amount, anti-dripping effects are decreased due to a decreased molecular weight of low-viscosity polydimethylsiloxane, and heat deflection temperature is decreased.

In addition, in Comparative Examples 4 and 5 in which an inorganic material known to have flame retardancy is input instead of calcium carbonate, heat resistance and melt index are not remarkably increased and flame retardancy is rather deteriorated, compared to Examples 1 to 4 in which the silicon-based compound and the calcium carbonate are simultaneously used.

As a result, it can be confirmed that, in the thermoplastic resin composition according to the present invention, the epoxy-based resin, the phosphorous-based flame retardant, the silicon-based compound and the calcium carbonate compound along with the basic resin are used simultaneously, and thus, heat resistance and mechanical rigidity of a resin are increased, whereby a thermoplastic resin composition having superior flame retardancy and excellent rigidity, heat resistance and processability and a molded article manufactured therefrom may be realized.

What is claimed is:

1. A thermoplastic resin composition comprising:
   100 parts by weight of a basic resin comprising 10 to 90% by weight of an acrylonitrile-butadiene-styrene (ABS) copolymer and 90 to 10% by weight of a vinyl aromatic compound-vinyl cyano compound copolymer selected from styrene-acrylonitrile (SAN), polystyrene (PS), and high impact polystyrene (HIPS);
   1 to 30 parts by weight of an epoxy-based resin;
   1 to 30 parts by weight of a phosphorous-based flame retardant;
   1 to 10 parts by weight of a silicon-based compound; and
   1 to 5 parts by weight of a calcium carbonate compound,
   wherein a viscosity of the silicon-based compound is 300,000 to 800,000 cst, and
   wherein the thermoplastic resin has a UL 94 flammability rating of V-1.

2. The thermoplastic resin composition according to claim 1, wherein the epoxy-based resin is one or more selected from the group consisting of a urethane-modified epoxy resin, a polyfunctional epoxy resin and a tetrafunctional epoxy resin.

3. The thermoplastic resin composition according to claim 2, wherein the urethane-modified epoxy resin is a polymer represented by Formula 1 below:

[Formula 1]

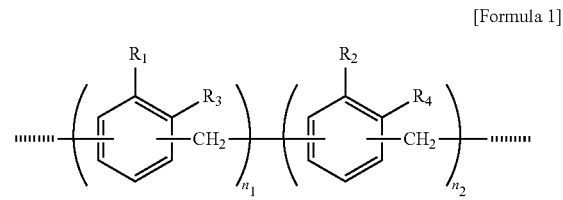

wherein $R_1$ is an epoxy group having a structure of

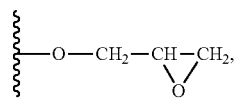 [SMILES: *OCC1CO1]

$R_3$ and $R_4$ are each independently hydrogen or an aryl group, $n_1$ and $n_2$ are a natural number of 1 to 100, and $R_2$ is a group represented by Formula 2 below, a terminal of which is substituted with isocyanate:

[Formula 2]

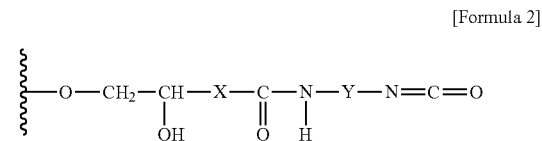

wherein X and Y are each independently a $C_1$ to $C_{20}$ alkylene or arylene group, the alkylene or arylene group randomly comprises oxygen, nitrogen or a combination thereof.

4. The thermoplastic resin composition according to claim 2, wherein the polyfunctional epoxy resin is a polymer represented by Formula 3 below:

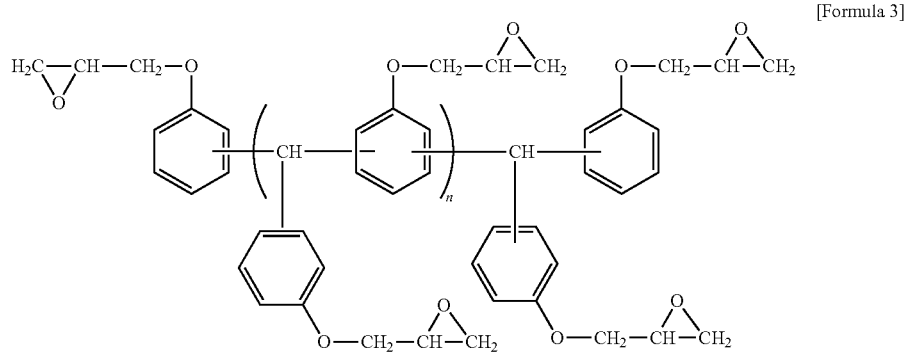

[Formula 3]

wherein n is a natural number of 1 to 100.

5. The thermoplastic resin composition according to claim 2, wherein the tetrafunctional epoxy resin is a polymer represented by Formula 4 below:

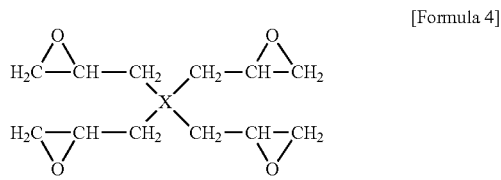

[Formula 4]

wherein X is an atomic group formed by subtracting four hydrogen atoms from a $C_1$ to $C_{30}$ aliphatic or aromatic hydrocarbon, and the atomic group randomly comprises oxygen, nitrogen or a combination thereof.

6. The thermoplastic resin composition according to claim 1, wherein the ABS copolymer comprises 30 to 70% by weight of butadiene based on a total weight of the ABS copolymer.

7. The thermoplastic resin composition according to claim 1, wherein a weight-average molecular weight of the vinyl aromatic compound-vinyl cyano compound copolymer is 10,000 to 300,000 g/mol, and comprises 5 to 50% by weight of the vinyl cyano compound.

8. The thermoplastic resin composition according to claim 1, wherein the phosphorous-based flame retardant is one or more selected from the group consisting of phosphate-based compounds, diphosphate-based compounds, polyphosphate-based compounds having three or more phosphate groups, phosphonate-based compounds, phosphinate-based compounds and diethylphosphinic acid metal compounds.

9. The thermoplastic resin composition according to claim 1, wherein the silicon-based compound is a compound represented by Formula 5 below:

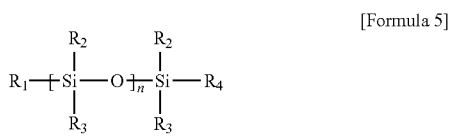

[Formula 5]

wherein $R_1$ and $R_4$ are each independently a $C_1$ to $C_{20}$ alkyl group, $R_2$ and $R_3$ are each independently a $C_1$ to $C_{10}$ alkyl group, and n is a positive number.

10. The thermoplastic resin composition according to claim 1, wherein an average particle diameter of the calcium carbonate compound is 0.1 to 50 μm.

11. The thermoplastic resin composition according to claim 1, wherein the thermoplastic resin composition further comprises one or more additives selected from the group consisting of an impact modifier, a thermal stabilizer, an anti-dripping agent, an antioxidant, a light stabilizer, a UV filter, a pigment and an inorganic filler.

12. The thermoplastic resin composition according to claim 1, wherein the thermoplastic resin composition has a heat deflection temperature (HDT) of 77 to 90° C.

13. The thermoplastic resin composition according to claim 1, wherein the thermoplastic resin composition has a melt flow rate (MFR) of 56 to 100 g/10 min.

14. A molded article manufactured from the thermoplastic resin composition according to claim 1.

* * * * *